(12) United States Patent
Fenger

(10) Patent No.: US 9,845,791 B2
(45) Date of Patent: Dec. 19, 2017

(54) METHOD AND MEANS FOR ESTABLISHING ACCESS TO THE MAIN PARTS IN THE NACELLE ON A WIND TURBINE

(71) Applicant: LIFTRA IP ApS, Aalborg SV (DK)

(72) Inventor: Per Fenger, Terndrup (DK)

(73) Assignee: LIFTRA IP APS, Aalborg SV (DK)

( * ) Notice: Subject to any disclaimer, the term of this patent is extended or adjusted under 35 U.S.C. 154(b) by 405 days.

(21) Appl. No.: 14/405,569

(22) PCT Filed: Jun. 4, 2013

(86) PCT No.: PCT/DK2013/050170
§ 371 (c)(1),
(2) Date: Dec. 4, 2014

(87) PCT Pub. No.: WO2013/182198
PCT Pub. Date: Dec. 12, 2013

(65) Prior Publication Data
US 2015/0132119 A1    May 14, 2015

(30) Foreign Application Priority Data

Jun. 4, 2012    (DK) .................................. 2012 00383

(51) Int. Cl.
*F03D 80/50* (2016.01)
*F03D 13/10* (2016.01)

(52) U.S. Cl.
CPC .............. *F03D 80/50* (2016.05); *F03D 13/10* (2016.05); *F05B 2240/14* (2013.01); *Y02E 10/726* (2013.01); *Y10T 29/49826* (2015.01)

(58) Field of Classification Search
CPC ..... F03D 80/50; F05B 2240/14; Y02E 10/726
See application file for complete search history.

(56) References Cited

U.S. PATENT DOCUMENTS 5,649,392 A * 7/1997 Svenning ................ F03D 80/50
  52/66
9,228,562 B2 * 1/2016 Mercado Diez ........ F03D 1/003
(Continued)

FOREIGN PATENT DOCUMENTS

CN    202100389 U     1/2012
EP    1 677 000 A2    7/2006
(Continued)

*Primary Examiner* — Jacob Cigna
(74) *Attorney, Agent, or Firm* — David S. Safran

(57) ABSTRACT

A method for establishing access for mounting and dismounting of main shafts, gearbox, generator and other main parts located in the nacelle of a wind turbine, where the cabriolet remains localized on the nacelle, and guide transfer mechanisms are provided for mounting inside the nacelle. The basic idea is that the cabriolet is lifted upon rolls or roll sets which form the guide transfer mechanisms upward facing support surfaces, and that the cabriolet is stabilized by displaceable counter holds which are displaced and locked in position above the downwards positioned mounting flange, upon which the cabriolet can be displaced on the rollers or roll sets to a partly cantilevered position over the rear end of the nacelle. By the method, service on larger wind turbines can be performed without using mobile cranes, which saves resources.

7 Claims, 10 Drawing Sheets

(56) References Cited

U.S. PATENT DOCUMENTS

| | | | |
|---|---|---|---|
| 2011/0142616 A1* | 6/2011 | Christensen | F03D 80/00 |
| | | | 415/224 |
| 2011/0243726 A1* | 10/2011 | Wohlleb | F03D 80/00 |
| | | | 415/213.1 |
| 2013/0089433 A1* | 4/2013 | Mercado Diez | F03D 1/003 |
| | | | 416/244 R |
| 2013/0259677 A1* | 10/2013 | Kamibayashi | F03D 13/10 |
| | | | 415/213.1 |
| 2014/0030111 A1* | 1/2014 | Kohne | E06B 9/0638 |
| | | | 416/244 R |

FOREIGN PATENT DOCUMENTS

| | | |
|---|---|---|
| EP | 1 677 001 A2 | 7/2006 |
| EP | 2 570 653 A1 | 3/2013 |
| WO | 92/06295 A1 | 4/1992 |
| WO | 2012/105971 A1 | 8/2012 |

* cited by examiner

METHOD AND MEANS FOR ESTABLISHING ACCESS TO THE MAIN PARTS IN THE NACELLE ON A WIND TURBINE

BACKGROUND OF THE INVENTION

Field of the Invention

The present invention relates to a method for establishing access to the removal and installation of the main shaft, gearbox, generator and other main parts located in the nacelle of a wind turbine, the cabriolet remains localized on the nacelle, and guide mechanisms to perform the invention.

Description of Related Art

When carrying out service and repair work on large wind turbines, there is a need to be able to get access to mount and dismount vital and relatively heavy parts of the wind turbine, which is located in the interior of the nacelle. These parts are for example the main shaft, gearbox, generator and other major parts, which not can be transported up and down through the wind turbine tower, and where either the use of cranes or crane winch between the nacelle and a station on the ground, to handle said parts, which require that there is access to the nacelle from above. This access has so far been obtained by simply removing the nacelle cabriolet (the roof), and the hoist it down to earth by the use of a mobile crane and hoist the cabriolet in place after completion of servicing/repair of the windmill. This requires, however, the presence of a mobile crane, which is relatively expensive operation since the crane charged at the hourly rental. In cases where there used winches for the transport of the heavy parts from the nacelle and the ground surface, the handling of the nacelle cabriolet be a difficult operation due the relatively bulky design of the cabriolet, hence the need to operate with alternative solutions.

An alternative option could be to mount the cabriolet on the nacelle with a hinge connection, and with hydraulically operated pistons, for example in combination with exchange mechanisms whereby the cabriolet could be opened as seen at smaller turbine types. However, such solutions require the installation of fixed installations in a nacelle, in which is already scarce space, and the solution is relatively expensive compared to the number of times where such installation is required.

Thus, there is a need for an alternative solution to the above problem which is both flexible and which is universally applicable for convertibles on the nacelles of different sizes and types of wind turbines.

SUMMARY OF THE INVENTION

It is the object of the invention to provide a solution where the cabriolet remains on the nacelle top, but at the same time establishes access for removal and installation, as well as hoisting up and down of a wind turbine main shaft, gearbox, generator and other major parts are arranged in the nacelle on wind turbines.

This object is achieved by a method for establishing access to the removal and installation of the main shaft, gearbox, generator and other main parts located in the nacelle of a wind turbine, where the nacelle cabriolet remains on the nacelle and comprising the following operations;

mounting at least two sets of pairs of opposing guide transfer mechanisms on the inner side of the nacelle respectively near the front end (the shaft end) and the rear end, the upwardly facing free ends of which comprises at least one roller, displacement of the free ends of the guiding transfer means to abutment with the abutment flange of the cabriolet relative to the nacelle base by jacks or winches, displacement of a counter holding roller located in the level above the roller(s) and the abutment flange of the cabriolet in position above the abutment flange of the cabriolet at each guide transfer mechanism, and displacement of the cabriolet in a backwards direction, away from the front end, to a position where a part of the cabriolet is cantilevered over the rear edge of the nacelle.

This provides the possibility to perform a rearward displacement of the nacelle cabriolet to an extent, which results in providing sufficient access to remove major parts of the interior of the nacelle by means of winches, without the use of an actual crane.

A guide transfer mechanism, for mounting on the inner surface of a nacelle with a cabriolet and/or mounting to the static stable parts of a wind turbine arranged in the nacelle, for lifting and displacement of the cabriolet on the nacelle of wind is characterized in, that the guide transfer mechanism comprises a console with mounting facilities for mounting the console in the inside of the nacelle and/or static stable parts of the wind turbine arranged in the nacelle, said console comprising a first horizontally orientated frame section, and a from this second integrated vertically orientated, downwards extending, tube shaped part, for receiving and guiding of a therein vertical displaceable cooperating first member, the first lower end of which is adapted to cooperate with lifting means for displacement of the first member, and the other upper end of which comprises at least a first roller, or roller set, the upwards facing carrying surface is located in the same horizontal plane and mounted on horizontally oriented shaft(s).

Hereby is achieved the advantage that the guide transfer mechanisms used for lifting and displacement of the cabriolet, can be mounted on any wind turbine and removed again after use, that is, to the universal application principle is ensured. The advantage is also that by displacement of the vertically oriented displaceable first means in the upward direction by means of a jack, winch, a pulley block or other suitable means it is obtained that the roll or roll set in the upper free end of the displaceable member is brought into abutment with the downwardly facing side of the flange of the cabriolet, and a continued upward displacement of the member will result in that the cabriolet come to rest on the roll or roll set, or, more correct expressed, the rollers of each of the four supporting points, whereby the cabriolet can be displaced some backward, in the direction away from the hub of the wind turbine, in a carefully controlled movement, possibly guided by pulleys, winches, lashing straps, or similar equipment, thus ensuring that the cabriolet do not run off the rolls, and dropped.

The guide transfer mechanisms can be transported from the surface to the nacelle inside the wind turbine tower may be designed in light metal or composite material in order to reduce weight accordingly, which will facilitate its handling and fitting.

With the intent of ensuring that the displacement of the cabriolet should not be exaggerated so that it is dropped, the guide transfer mechanism further comprises a second roll, or counter hold, mounted on a horizontally oriented shaft, located at a level above the first roll or roll set, said second roller or counter hold is displaceable between a passive retracted position, where the roller or counter hold is located outside the first rolling bearing surface, and an advanced, active lockable position where the second roller or the counter hold is positioned at a level above the first roll or roll set's bearing surface.

By placing the counter hold or roll in the active projecting locked position, it is achieved that the displacement of the cabriolet is limited by the second roller or counter hold, so that the displacement is limited to the point where the roller or the counter hold comes in abutment with the inner surface of the front end of cabriolet, and simultaneously controlled displacement of the cabriolet parallel to the nacelle. Moreover, the counter hold ensures that the cabriolet does not tilt over its center of gravity, and thus, is the lost. The counter hold or roller also ensures the cabriolet against gust of wind.

With the intent to maximize stability during displacement of cabriolet, the guide transfer mechanism according to the invention may comprise locking means between the vertically oriented tubular member and the vertically displaceable member for attachment of the vertically displaceable first member in a preferred position.

Hereby is achieved that the vertically displaceable member is lockable with the roll or roll set at a preferred level, and thus there is provided a stable support of the rollers or roller sets on which the cabriolet can be displaced. The locking means may for example consist in through-holes in the vertical tubular member and the sliding body which can be made to overlap by adjusting the displacement of the body with jacks, winches, pulley blocks, etc. after which a locking bolt is introduced through the overlapping holes and secured with a locking ring, split or similar. Then, slacken the means used for the displacement of the body, then roll/roll set is supported by the locking bolt.

With the intention further to stabilize the rear guide transfer mechanisms, the first horizontally oriented frame section may further comprise cooperating mounting facilities at the first end of the horizontally oriented, and with respect to the first frame part longitudinal axis, obliquely extending support beams, the other end of which includes mounting facilities for mounting for fitting on an inner adjacent side of the nacelle.

This provides better stability of the rear transfer mechanisms against twisting, provided that the cabriolet during the displacement is influenced by wind or other forces which do not run parallel to the longitudinal axis of the nacelle.

In a particular embodiment of the guide transfer mechanism according to the invention, the vertically displaceable cooperating first member comprises a jack, for displacement of the first member in the vertical direction, guided in the vertically oriented tubular member.

The embodiment will inevitably cause the guide transfer mechanism becomes heavier to handle, but can in some cases be advantageous.

In a further embodiment of the guide transfer mechanism according to the invention, the first lower end of the vertically displaceable cooperating first member comprise a groove cut wheel which cooperates with a winch, a pulley block or lashing straps belonging to the guide transfer mechanism, the ends of which are attachable to the bracket, and passed through the groove cut wheels for the displacement of the first member in the vertical direction guided in the vertical tubular member.

The invention is briefly described in the following with reference to the accompanied drawings.

DETAILED DESCRIPTION OF THE INVENTION

Figure 1:
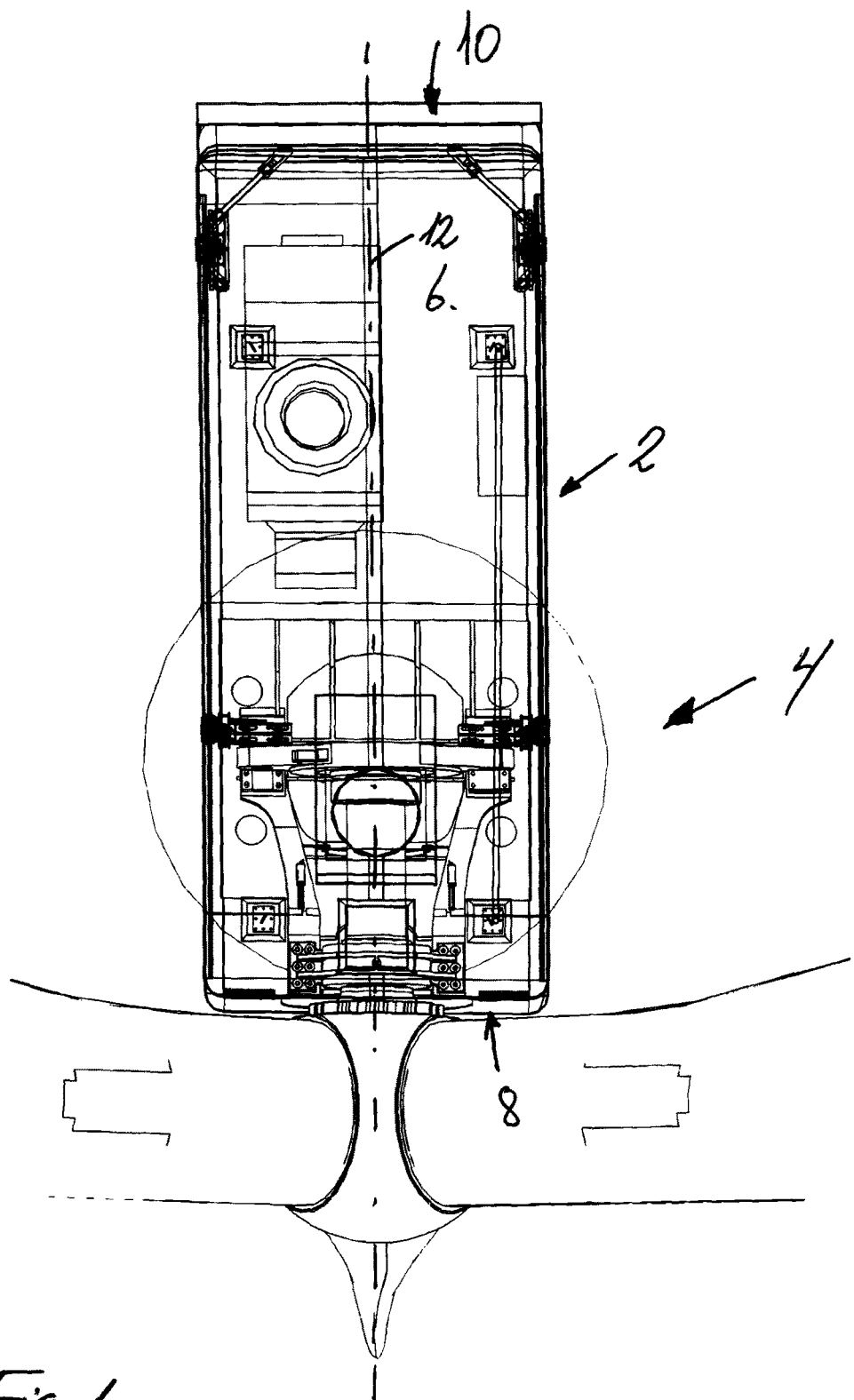
FIG. 1 is a view of a nacelle on a wind turbine seen from above, where the cabriolet is closed.

FIG. 1 is a view of the nacelle 2 on a wind turbine 4 seen from above where the cabriolet 6 is closed. The nacelle has a front end 8 and a rear end 10, and a center axis 12. In the view the cabriolet is made transparent.

Figure 2:
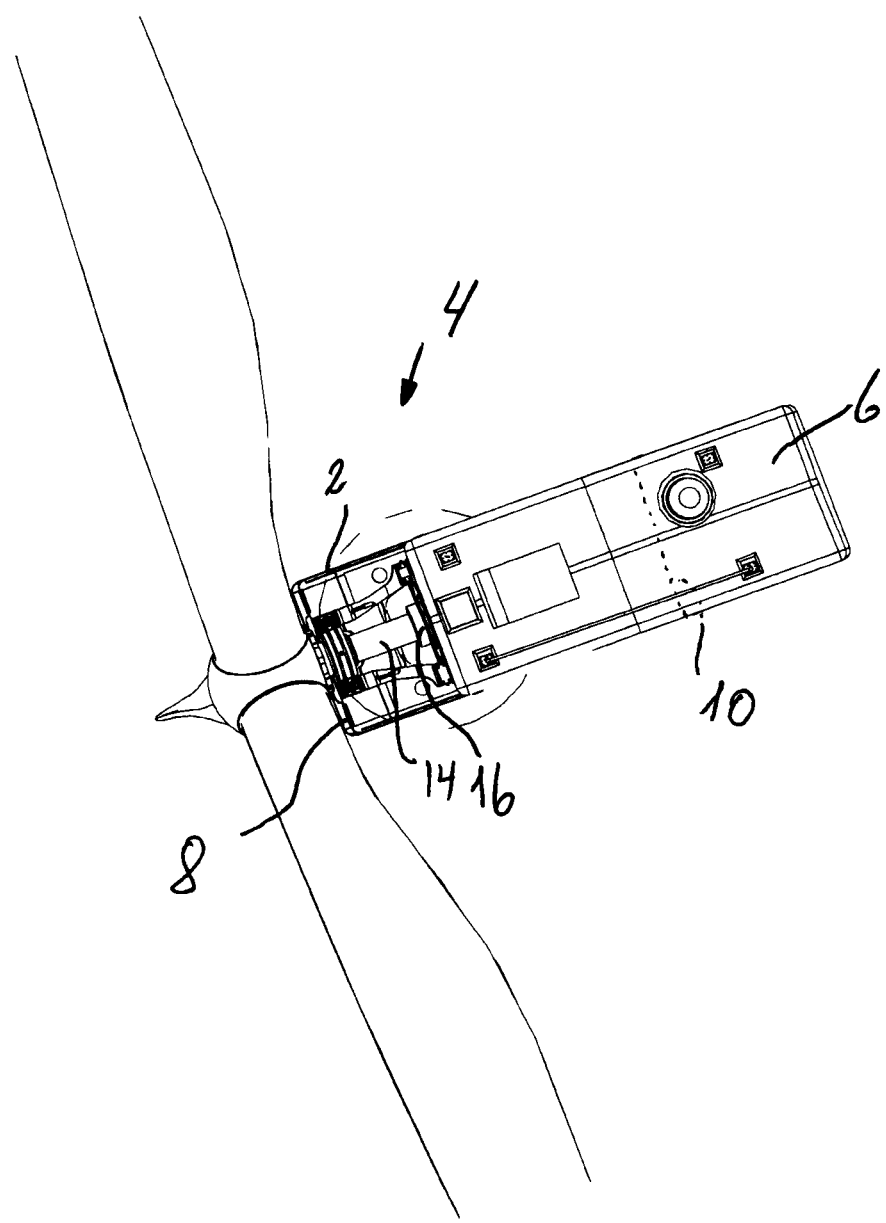
FIG. 2 is a view of the nacelle in FIG. 1 seen from above, but with the cabriolet displaced backwards according to the method according to the invention.

In FIG. 2, which is a view of the nacelle 2 shown in FIG. 1, the cabriolet is displaced backwards above the rear end 10 of the nacelle so the main shaft 14 and the gearbox 16 etc. of the wind turbine is exposed.

Figure 3:
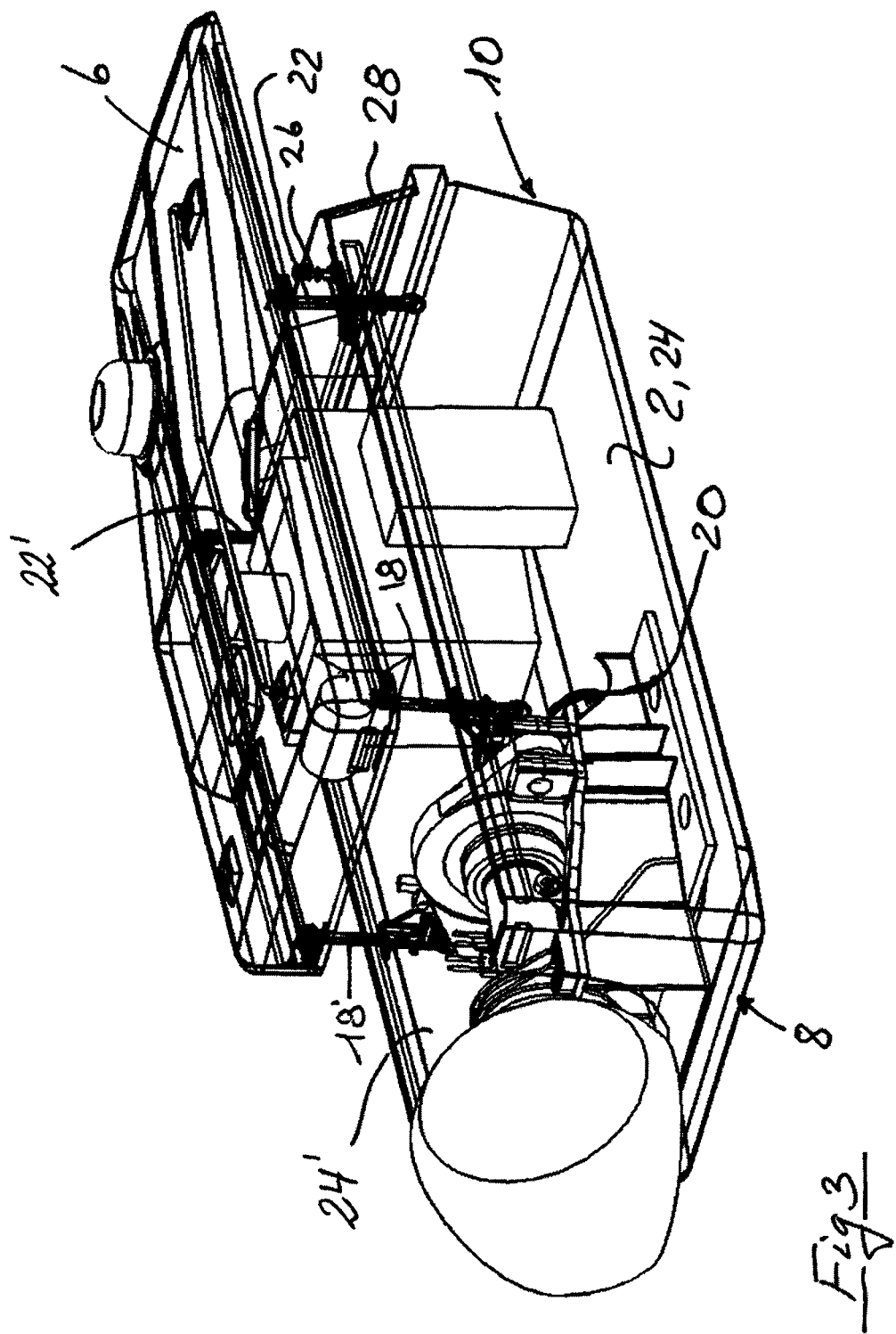
FIG. 3 is a perspective view of FIG. 2.

In FIG. 3, which is a perspective view of the nacelle shown in FIGS. 1 and 2, where the nacelle 2 and the cabriolet 6 is made transparent, appears how the cabriolet 6 is raised and carried respectively on a first set of guide transfer mechanisms 18, 18', mounted on statically stable structural components 20 in the nacelle 2 close to the front end 8 of the nacelle, and a second set of guide transfer mechanisms 22, 22' mounted on the parallel long sides 24, 24' of the nacelle and with support beams 26 mounted on the rear side 28 of the nacelle.

Figure 4:
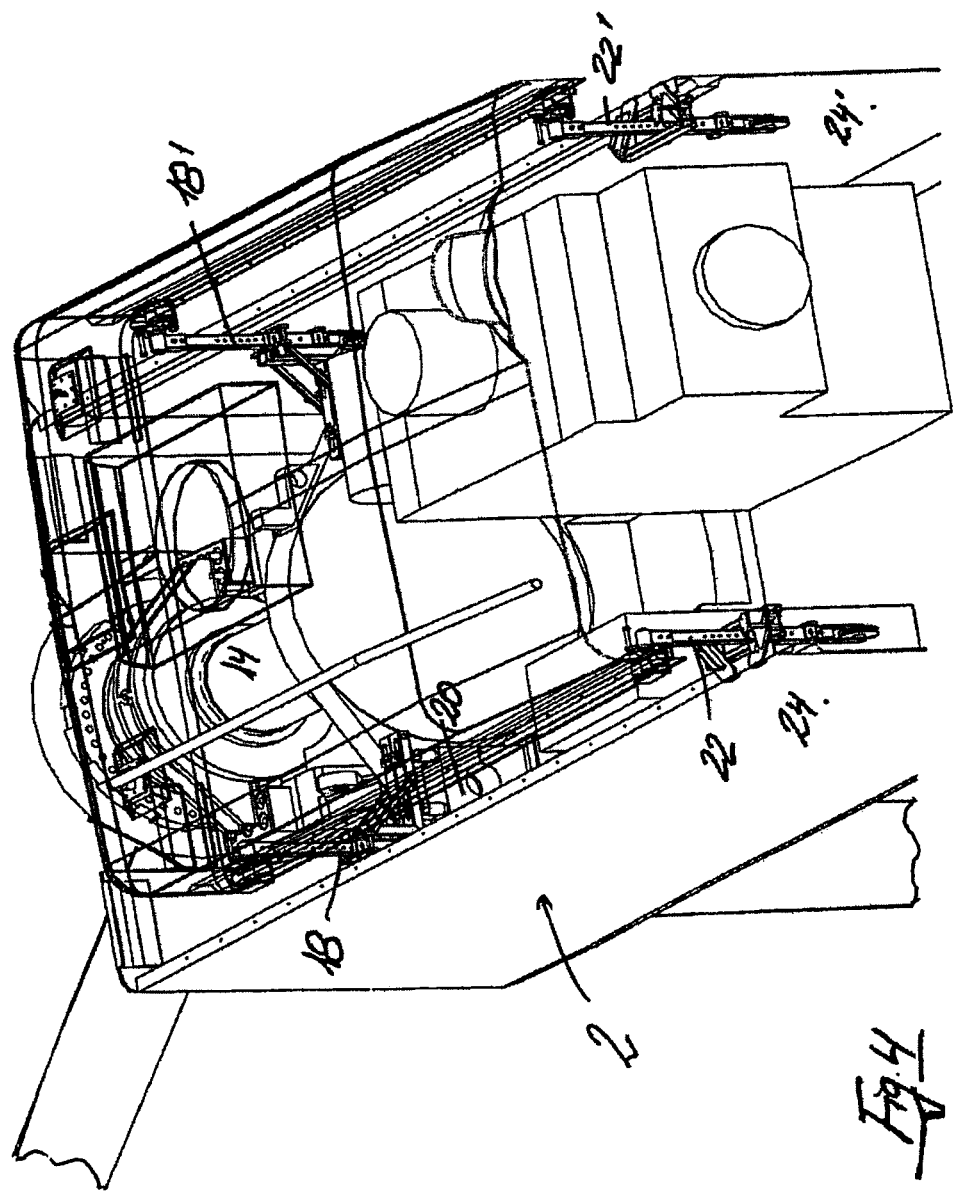
FIG. 4 is a perspective detail section view of the nacelle shown in FIGS. 2 and 3 seen obliquely from behind, and where the cabriolet is transparent.

In FIG. 4, which is a perspective section view of the nacelle 2 seen obliquely from behind and above, it appears more in detail how the first set of guide transfer mechanisms 18, 18' is mounted to mechanical stable structural components 20 close to the front end 8 of the nacelle, and how the second set of guide transfer mechanisms 22, 22' is mounted on the parallel sides 24, 24' of the nacelle 2.

Figure 5:
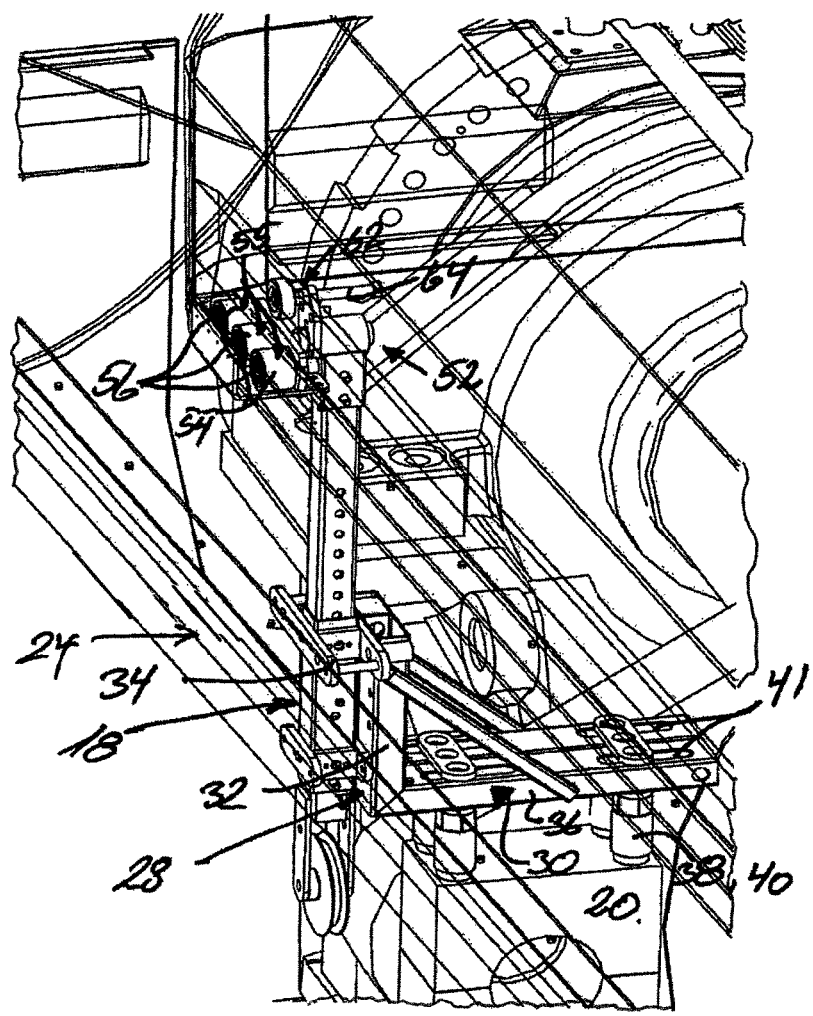
FIG. 5 shows a first embodiment of a guide transfer mechanism for mounting on statically stable structural components mounted near the front end of the nacelle, to perform the method according to the invention.

In FIG. 5 is disclosed a detail section showing how the first guide transfer mechanism 18 is mounted to a mechanical stable structural component 20 in the nacelle 2. The mounting facilities 28 consists in the shown embodiment of a stiffened angle frame 30, the vertical oriented leg 32 of which is connected with a first horizontally oriented frame part 34 near the nacelle wall 24, and the horizontally oriented angle leg 36 via spacers 38 and bolts 40 introduced through mating holes 41 in the angle leg 36, is fixed to the mechanically stable structural member 20.

Figure 6:
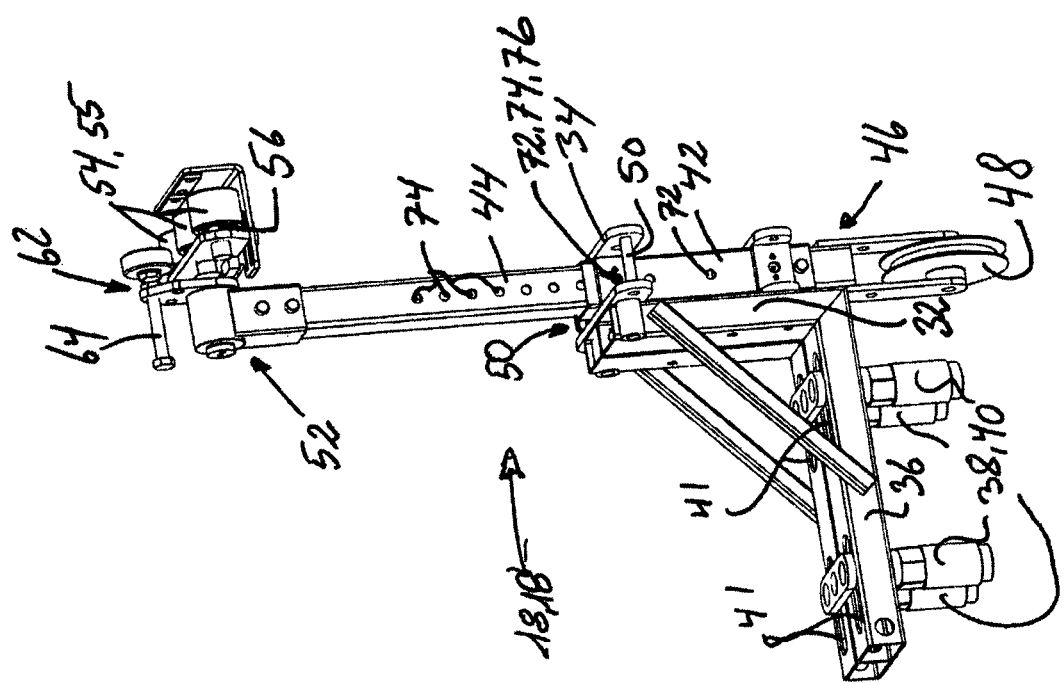
FIG. 6 is a detail perspective view of the embodiment of a guide transfer mechanism shown in FIG. 5.

As it further appears from FIG. 5, and more clearly from FIG. 6, which is a perspective view of an embodiment of the first guide transfer mechanism 18, 18' where its design is seen more in detail. The guide transfer mechanism 18, 18' comprises the first horizontally oriented frame section 34 which is attached to the angle frame 30.

Figure 7:
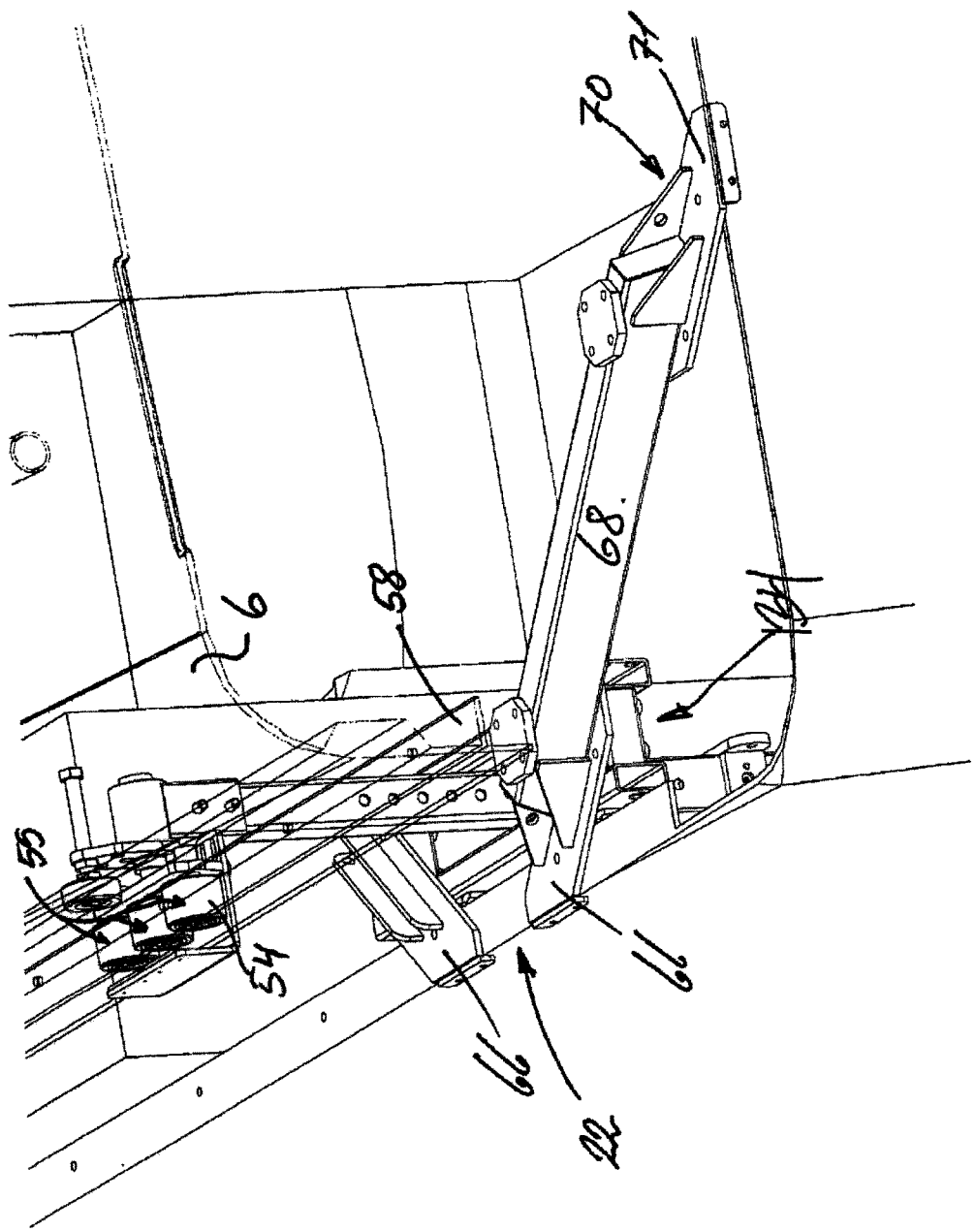
FIG. 7 shows a second embodiment of a guide transfer mechanism for mounting on the nacelle sides, mounted near the rear end of the nacelle.
Figure 8:
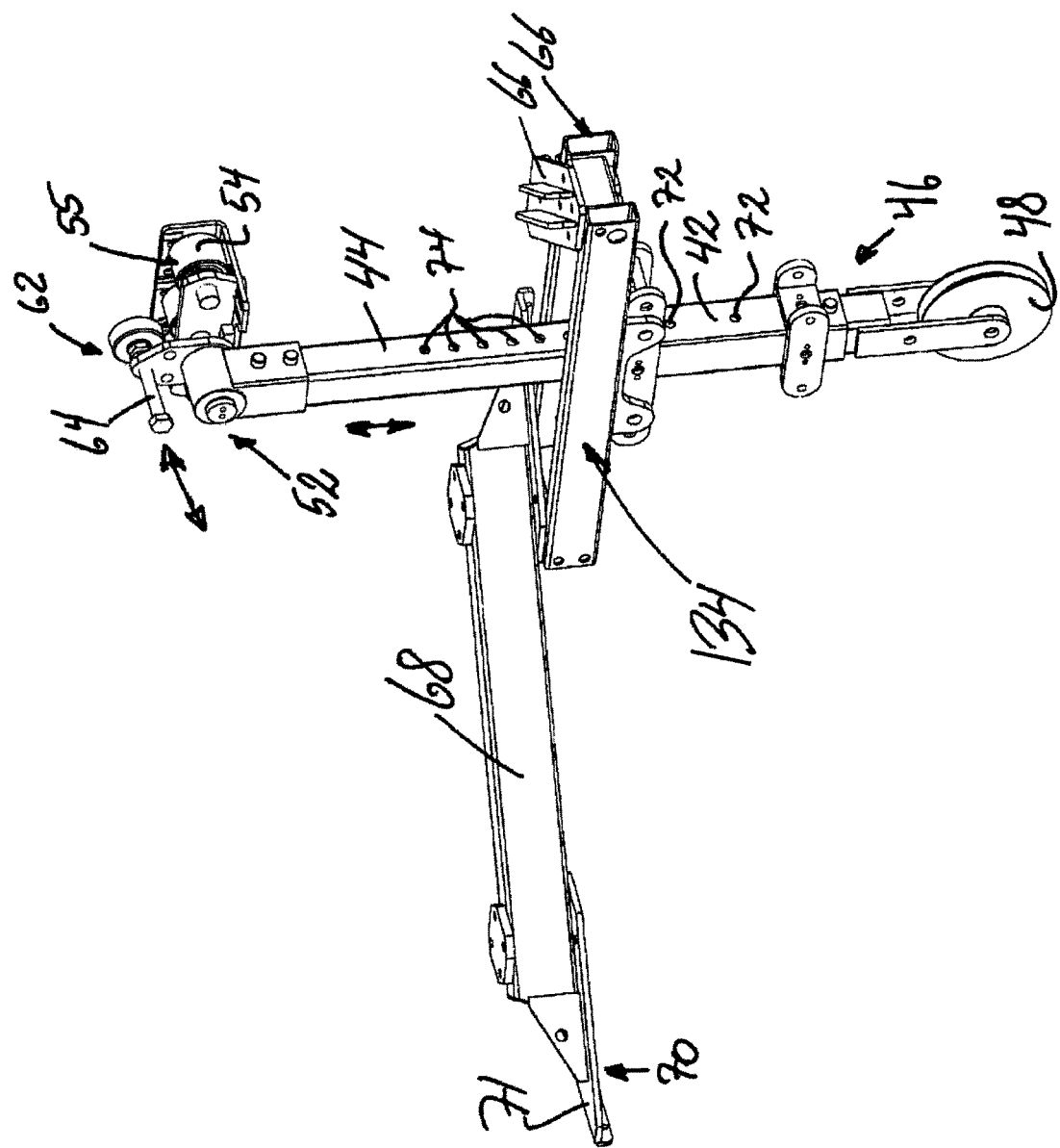
FIG. 8 is a first detail perspective view of the embodiment of a guide transfer mechanism shown in FIG. 7.
Figure 9:
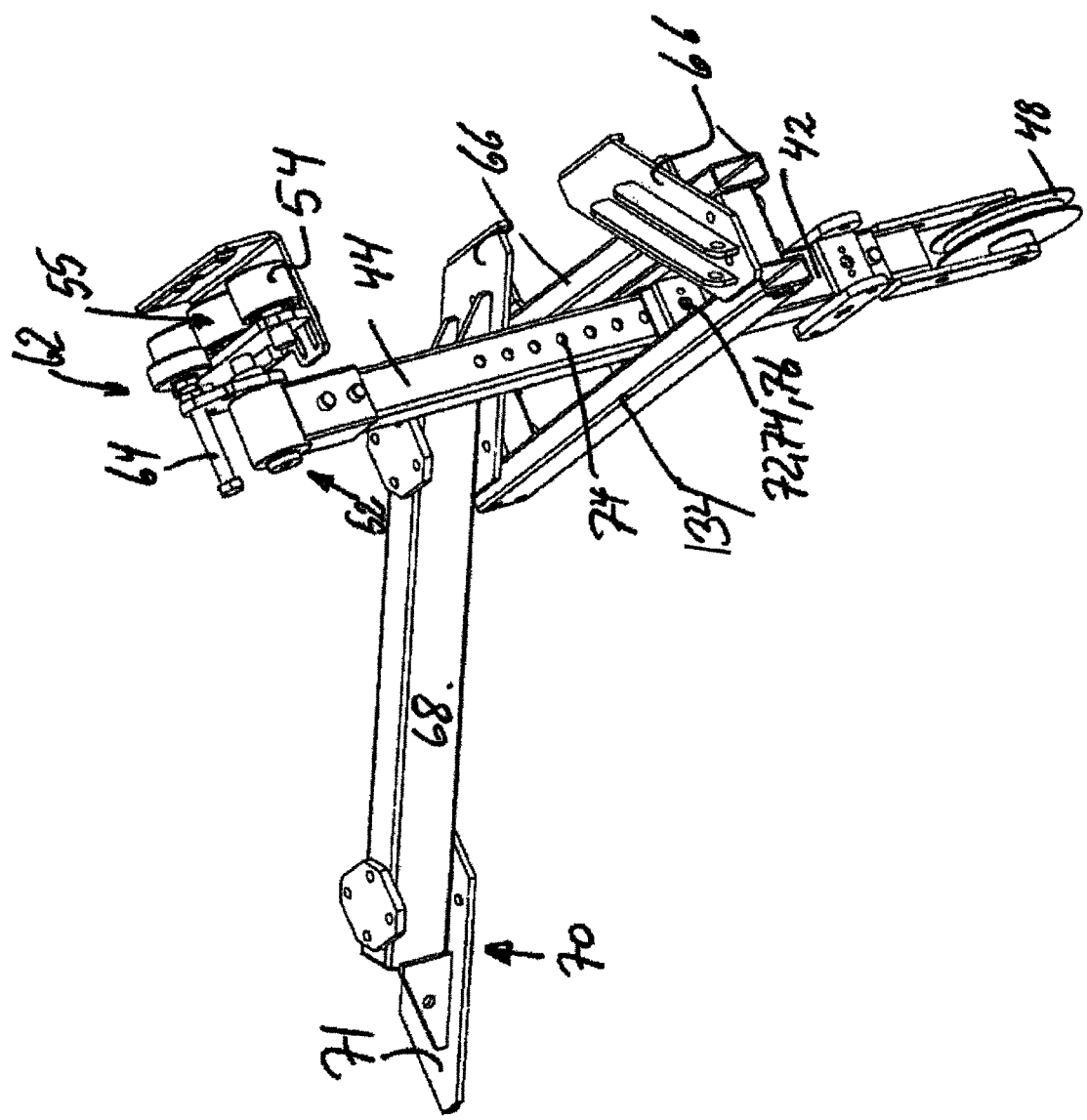
FIG. 9 is a second detail perspective view of the embodiment of a guide transfer mechanism shown in FIGS. 7 and 8.

In FIG. 7, is shown a second embodiment 22, 22' of the guide transfer mechanism suited for mounting on respectively the inner long sides 24, 24' of the nacelle 2 and on the inner rear wall 28 of the nacelle. This embodiment of the guide transfer mechanism comprises besides the first horizontally oriented frame section 134 with mounting facilities 66 for mounting on the nacelle sides 24, 24', further an oblique extending frame part 68, the free end of which 70 includes mounting facilities 71 on the rear wall 28 of the nacelle 2. This will provide this second embodiment 22, 22' of the guide transfer mechanism the required stability to withstand the forces to be transferred to the nacelle sides when the cabriolet 2 is displaced backwards and forwards.

Common to the illustrated embodiments of the guide transfer mechanisms 18, 18' and 22, 22' is that a second integrated vertically oriented tube shaped part 42 extends downwards from the first horizontally oriented frame section 134, the second integrated vertically orientated tube shaped part 42 being designed for receiving and guiding a vertically displaceable first member 44, the first lower end 46 in the illustrated embodiment is provided with a groove cut wheel 48 arranged to cooperate with lifting means (not shown) for displacement of the first member 44, guided inside the vertically oriented tube shaped part 42. The lifting means for use with the illustrated embodiment may be formed of a pulley block and a lashing with a tighten mechanism, the ends of which is attached to cross pins 5Q arranged on each side of the tube shaped part 42 on the frame 134. By guiding the wire of the winch, the chain of the pulley block, or the lashing strap down and around the groove cut wheel 48, and subsequently tighten the wire, chain or the lashing strap with the suitable tighten mechanisms, there is performed a displacement of the first member 44 in vertical direction.

Figure 10:
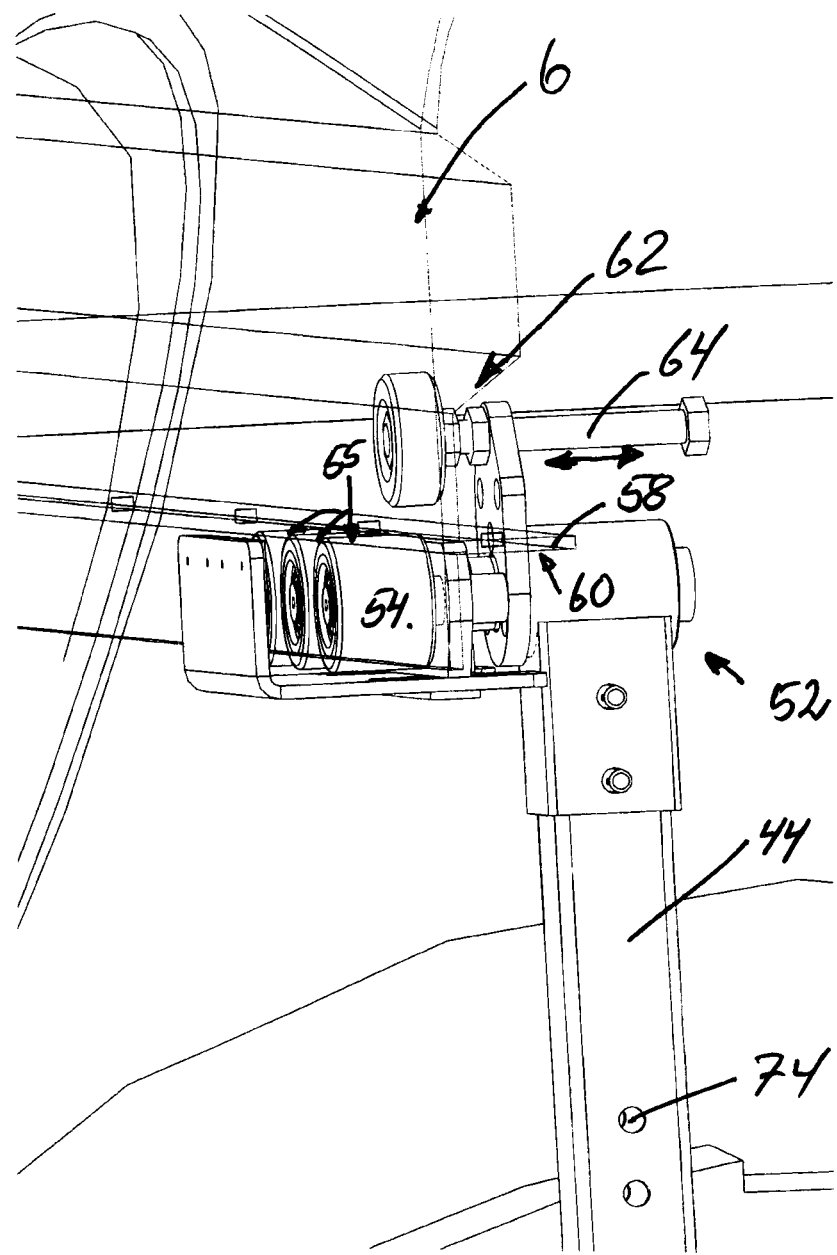
FIG. 10 is a detail perspective view of the second upper end of the guide transfer mechanism according to the invention.

The second upper end 52 of the vertical displaceable member 44 comprises in the embodiment shown, a set of rolls comprising three rolls 54, whose upwardly facing support surface 55 is located in the same horizontal plane and mounted on horizontally oriented shafts 56 It is the roller upwardly facing supporting surfaces 55, which at an upwardly-oriented displacement of the vertically displaceable member 44, is brought into abutment with the flange 58 on the lower side 60 of the cabriolet 6 (see also FIG. 10,) and by continued displacement of the member 44 upwards by the lifting means, the cabriolet 6 is lifted free of nacelle edge and can subsequently be displaced carried on rollers 54.

As is apparent from FIGS. 5-10, the guide transfer mechanism further comprises another roll or a counter hold 62, mounted on a horizontally oriented shaft 64 located in a level of the first roll set 54, the second roller or counter hold 62 is displaceable between a passive retracted position, in which the reel/counter hold 62 is located outside the support surface 55 of the first roll, and a forward, active position in which the second roller/counter hold 62 is positioned at a level above the supporting surface 55 of the first roller set 54.

Common to the embodiments of the guide transfer mechanism 18 18' and 22, 22' also applies to include locking means 70 between the vertically oriented tubular member 42 and the vertically displaceable first member 44 for retaining of the vertically displaceable first member 44 in a preferred position. The locking means 70 in the illustrated embodiments comprises the vertical tubular portion 42 and the displaceable member 44 comprises through-holes 72, 74 which can be made to overlap by adjusting the displacement of the body 44 with jacks, winches and pulley blocks etc. (not shown) after which a locking bolt 76 which is secured with a locking ring, split or similar (not shown) is introduced through the overlapping holes 72, 74. Then, the lifting means used for the displacement of the body is slackened, after which roll set 54 is supported by the bolt 76.

Access to mounting and de-mounting main shafts 14, gearbox 16, generator and other main parts arranged in the nacelle 2 on a wind turbine, without removing the cabriolet 2 from the nacelle 2 comprises the following operations;

mounting at least two sets of pairs of opposing guide transfer mechanisms 18, 18', 22, 22', the upwardly facing free ends 52 of which comprises at least one roller 54, on the inner side of the nacelle close to respectively near the front end (the shaft end) and the rear end.

displacement of the free ends 52 of the guide transfer mechanisms 18, 18',22, 22' to abutment with the abutment flange 58 of the cabriolet by jacks or winches, displacement of a counter holding roller 62 located in the level above the roller(s) 54 and the abutment flange 58 of the cabriolet in position above the abutment flange 58 of the cabriolet at each guide transfer mechanism 18, 18', 22, 22', and displacement of the cabriolet 2 in backwards direction, away from the front end 8 of the nacelle 2 to a position where a part of the cabriolet 2 is cantilevered over the rear edge 10 of the nacelle.

Upon completion of work in the nacelle, the cabriolet 2 is displaced on the rollers 54, back to the original position, where after the vertically displaceable member 44 on the guide transfer mechanisms 18, 18', 22, 22' are lowered to the starting position and subsequently, the cabriolet is attached to the nacelle, and finally the guide transfer mechanisms 18, 18', 22, 22' are removed.

Finally, it is noted that the inventor has recognized that the guide transfer mechanism may be embodied in other designs than those described above and shown in the accompanying drawings. For example, each guide transfer mechanism 18, 18', 22, 22' could be equipped with an integrated jack, and the number of rolls 54 and counter holds 62 may be more or less than the number disclosed, but this does not alter the essential inventive aspect to provide access to the removal and installation of the main shaft, gearbox, generator and other main parts located in the nacelle of a wind turbine, without removal of the nacelle cabriolet from the nacelle, by providing the nacelle 2 with a number of guide transfer mechanisms 18, 18', 22, 22' with supporting rollers 54, on which the cabriolet 2 can be displaced sufficiently backward to be establish the appropriate access, as well as with lockable counter hold 62 for retaining and control of the displacement of the cabriolet.

What is claimed is:

1. Method for establishing access for removal and installation of shafts (14), gearbox (16), generator and other parts located in a nacelle (2) of a wind turbine (4), while a nacelle cabriolet (6) remains on the nacelle (2) and comprising the following operations;

mounting at least two sets of pairs of opposing guide transfer mechanisms (18, 18', 22, 22'), on an inner side (24, 24', 28) of the nacelle respectively proximate a front end (8) and a rear end (10), upwardly facing free ends (52) of the guide transfer mechanisms comprise at least one first roller (54), displacement of the free ends (52) of the guiding transfer mechanisms to abutment with an abutment flange (58) of the cabriolet relative to a nacelle base by jacks or winches, displacement of a counter holding roller or counter hold (62) located above the first roller (s) and the abutment flange (58) of the cabriolet at each guide transfer mechanism (18, 18', 22, 22'), displacement of the cabriolet (6) in a backwards direction, away from the front end (8) to a position where a part of the cabriolet is cantilevered over the rear end (10) of the nacelle.

2. Guide transfer mechanism, for mounting on an inner surface of a nacelle (2) with a cabriolet (6) and/or mounting to static stable parts (20) of a wind turbine arranged in the nacelle (2), for lifting and displacement of the cabriolet (6) on the nacelle (2) of wind turbines (4) for use in establishing access for removal and installation of main shafts, gearbox, generator and other main parts located in the nacelle of a wind turbine, comprising a console (34, 42) with mounting facilities (32, 36, 38, 40, 66, 68, 71) for mounting a console inside of the nacelle (2) and/or static stable parts (20) of the wind turbine arranged in the nacelle (2), said console comprising a first horizontally orientated frame section (34), and a second integrated vertically oriented, downwards extending, tube shaped part (42), extending from the first horizontally oriented frame section, for receiving and guiding of a vertical displaceable cooperating first member (44), a first lower end (46) of the downwards extending, tube shaped part is adapted to cooperate with lifting means for displacement of the first member (44), and an upper end (52) of the first member comprises at least a first roller (54), or roller set, an upwards facing carrying surface (55) of which is located in a same horizontal plane and mounted on horizontally oriented shaft(s) (56).

3. Guide transfer mechanism (18, 18', 22, 22') according to claim 2, further comprises further comprising a second roll or counter hold (62), mounted on a horizontally oriented shaft (64), located at a level above the first roll or roll set (54), said second roller or counter hold (62) being displaceable between a passive retracted position, where the roller or counter hold (62) is located outside bearing surface (55) the first roll or roll set (54), and an advanced, active position where the second roller/the counter hold (62) is positioned at a level above the bearing surface (55) of first roll or roll set's (54).

4. Guide transfer mechanism (18, 18', 22, 22') according to claim 2, further comprising locking means (72, 74, 76) between the vertically oriented tubular member (42) and the vertically displaceable member (44) for attachment of the vertically displaceable first member (44) in a preferred position.

5. Guide transfer mechanism (18, 18', 22, 22') according to claim 2, wherein the first horizontally oriented frame section (34) further comprises cooperating mounting facilities at the first end of the horizontally oriented frame section, and with respect to the first frame part longitudinal axis, obliquely extending support beams (68), another end (70) of the frame section includes mounting facilities (71) for mounting on an inner adjacent side (28) of the nacelle (2).

6. Guide transfer mechanism (18, 18', 22, 22') according to claim 2, wherein the vertically displaceable first member (44) comprises a jack for displacement of the first member in a vertical direction guided in the vertically oriented tube shaped part (42).

7. Guide transfer mechanism (18, 18', 22, 22') according to claim 2, wherein the first lower end (46) of the displaceable cooperating first member (44) comprises a groove cut wheel (48) which cooperates with a winch, pulley block or lashing straps belonging to the guide transfer mechanism, the ends of the winch, pulley block or lashing straps being attachable to a bracket, and passed through the groove cut wheel (48) for the displacement of the first member (44) in the vertical direction guided in the vertical tubular member (42).

* * * * *